April 3, 1928.  
H. K. HITCHCOCK  
1,665,060  
AUTOMATIC CONTROL MEANS FOR ELECTROMAGNETIC OPERATING DEVICES  
Filed Feb. 5, 1927  
3 Sheets-Sheet 1
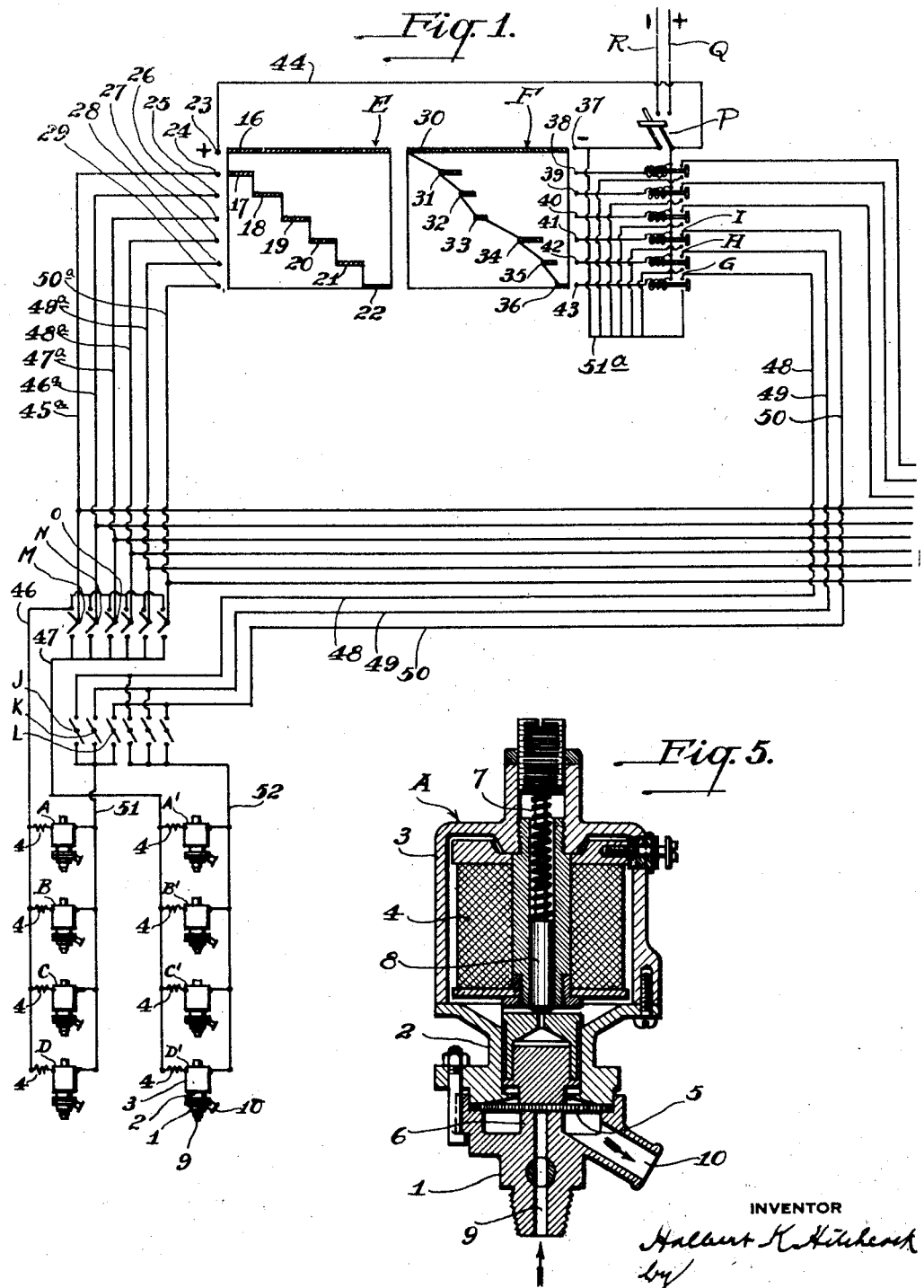

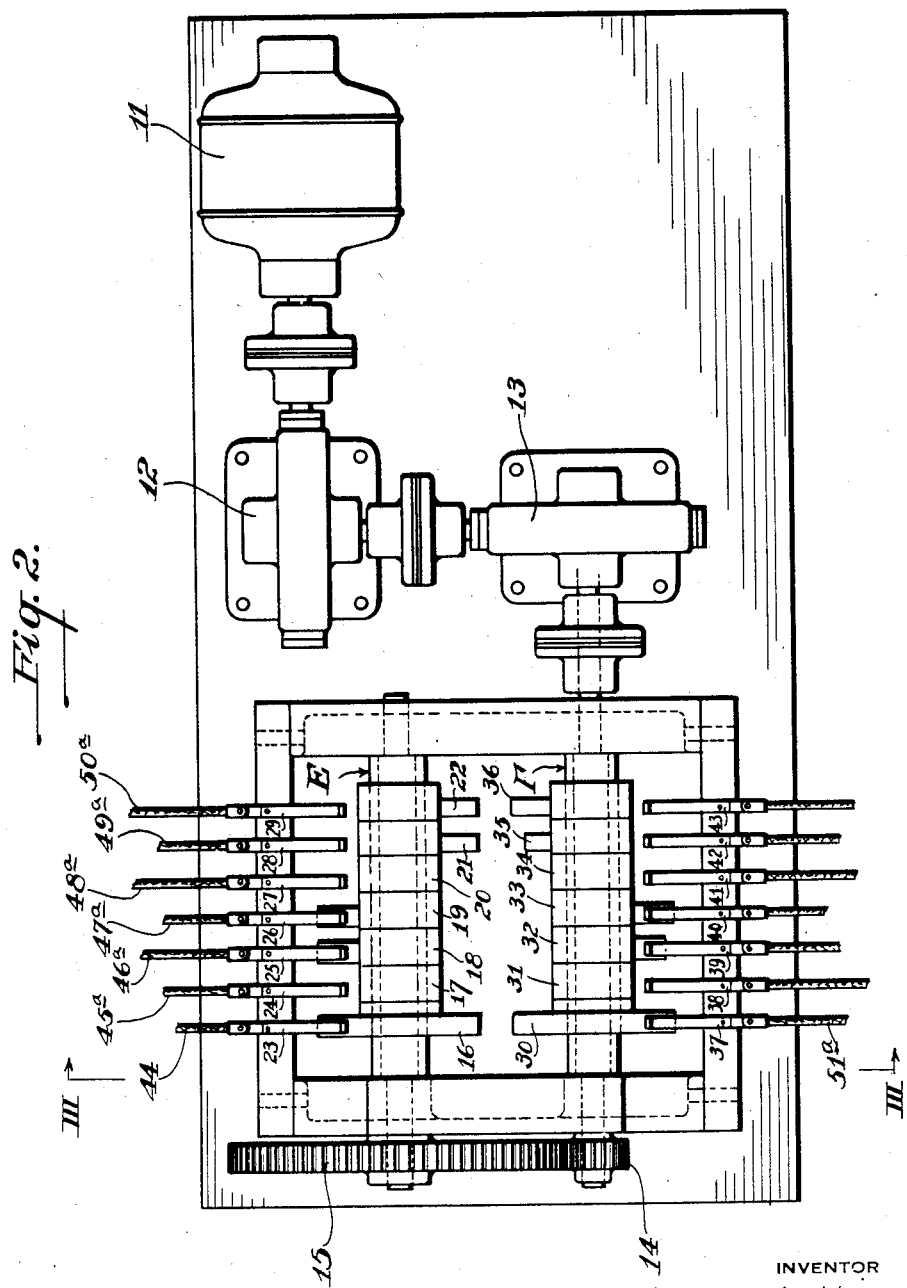

April 3, 1928.  1,665,060
H. K. HITCHCOCK
AUTOMATIC CONTROL MEANS FOR ELECTROMAGNETIC OPERATING DEVICES
Filed Feb. 5, 1927    3 Sheets-Sheet 3
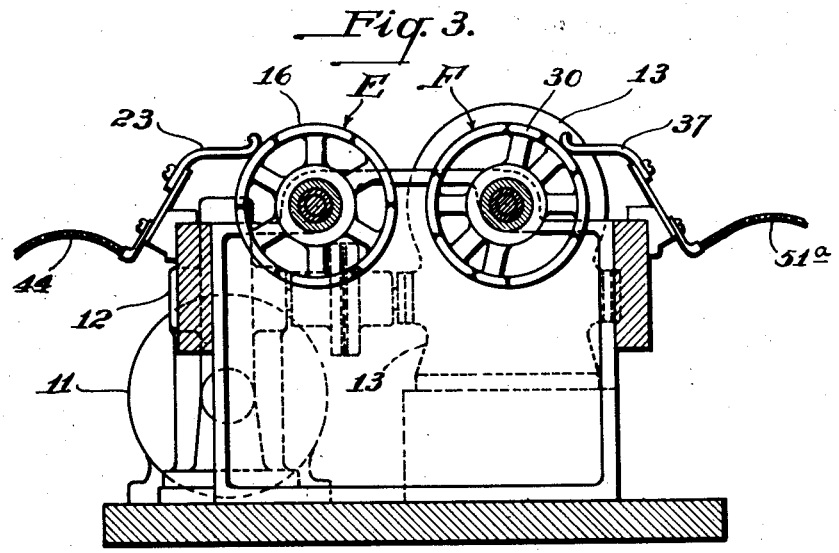
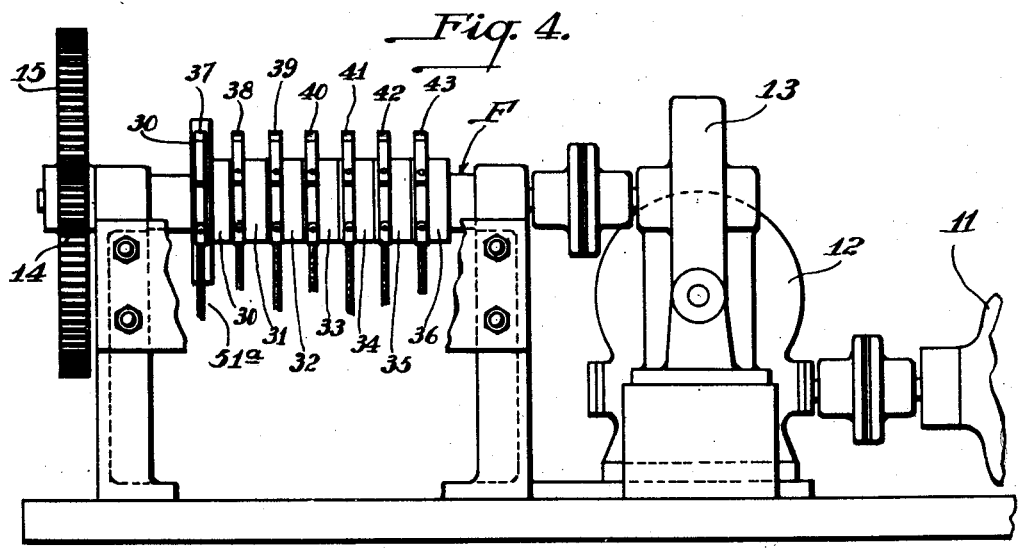
INVENTOR
Halbert K. Hitchcock
by
James C. Bradley
atty.

Patented Apr. 3, 1928.

1,665,060

UNITED STATES PATENT OFFICE.

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

AUTOMATIC CONTROL MEANS FOR ELECTROMAGNETIC OPERATING DEVICES.

Application filed February 5, 1927. Serial No. 166,156.

The invention relates to a control mechanism for a series of electro-magnetic operating devices. These devices are shown and described as controlling valves, which regulate the discharge of a rouge mixture and water to a series of polishing machines, but it will be understood that the control means is not limited to use for operating valves, but is of general application in any relation where a series of electro-magnets or solenoids are to be operated automatically and in which it is desirable to regulate the frequency of operation and the length of operation of each of the electro-magnetic devices. In the particular application of the invention here illustrated and described, each polishing machine is provided with a valve controlling the flow of rouge mixture, and another valve controlling the flow of water to the machine. It is desirable to supply both the rouge mixture and water at intervals instead of continuously, and the control means as herein described and illustrated provides a means whereby the intervals at which both the rouge mixture and water may be varied to suit requirements and whereby the length of the intervals (and thus the quantity of mixture supplied at each opening of the valves) may also be varied to suit requirements. The object of the invention is the provision of a simple apparatus for accomplishing the function stated having the number of circuits and wires reduced to a minimum. One embodiment of the invention is illustrated in the accompanying drawings, wherein:

Figure 1 is a diagrammatic view of the apparatus including the wiring. Figs. 2, 3 and 4 are views showing the drums and operating means therefor, Fig. 2 being a plan view, Fig. 3 a section on the line III—III of Fig. 2, and Fig. 4 a side elevation. And Fig. 5 is a section through one of the valves subject to the electric control.

Referring to the general arrangement as shown in Fig. 1, A, B, C and D and A', B', C' and D' the valves which are to be controlled; E and F are a pair of switch drums driven in timed relation as later described, such drums being shown in developed form so as to disclose their entire peripheries; G, H, I, etc. are a series of relays, J, K, L, etc. are a series of manually operable cut off switches for governing the flow of current through the relays, G, H, I, etc., M, N, O, etc., are another series of manually operable cut off switches governing the flow of current through the series of operating circuits, and P is a main cut off switch in the current supply lines Q and R. The drums E and F are timed so that the drum F rotates six times for each rotation of the drum E, the arrangement being such, as later described, that the drum E governs the frequency with which the valves A, B, C, etc. operate and the drum F controls the length of time which such valves remain open. The construction is also such that by the use of the two sets of switches J, K, L and M, N, O, the frequency of the operation of the valves and the lengths of time which the valves remain open may be varied widely to meet the conditions which arise with the various polishing units in a system such as that for which the apparatus is designed.

Although the valves (Fig. 5) which are operated constitute no part of the invention, being claimed in a copending application, Serial No. 166,155, of even date herewith, such valve will be briefly described in order to make clear the function of the electromagnetic windings, to the operating of which the present invention is directed. The valve comprises a body member 1, a cap 2, a casing 3 carrying the winding 4, and the diaphragm 5 of rubber clamped between the body member and the cap and engaging the valve seat 6. A spring 7 normally presses the stem 8 down causing the diaphragm to engage the seat 6. When current is supplied through the winding 4, the stem is moved upward, the fluid pressure in the body member 1, at such time pressing the diaphragm up so that there is a flow of liquid from the inlet 9 of the valve to the outlet 10 and thence to the glass sheet beneath which is being polished. In the particular arrangement shown, the inlets of the four valves A, B, C and D are connected to a conduit through which a rouge mixture is circulated under pressure, while the other four valves A', B', C' and D' have their inlets connected to a conduit through which water is circulated under pressure. The valves A and A' discharge to one polishing machine, (or more exactly to the surface of the glass beneath the polishing machine) while the valves B and B' discharge to the next machine of the series, so that each machine may be supplied with either the polishing mixture or pure water or both, and the intervals between applications and the amount applied may be regulated to meet all requirements.

The drums E and F are mounted in parallel, as indicated in Figs. 2 to 4 and the drum F is driven from the motor 11 through the intermediary of suitable reduction gearing in the casings 12 and 13, and the drum E is driven from the drum F by the spur gears 14 and 15 keyed to the drum shafts. The gear 15 has six times the number of teeth as the gear 14 so that the drum F rotates six times to each revolution of the drum E.

The drum E has a contact strip 16 at its end extending entirely around the drum, and six other contact strips 17 to 22 preferably in staggered relation as indicated in Fig. 1 with each strip extending around one sixth only of the circumference of the drum. The strips are all connected together electrically and are engaged by the brushes 23 to 29.

The drum F is also provided with a series of contact strips 30 to 36, the strip 30 extending entirely around the drum and the other strips being relatively short, of varying length and arranged at varying angular position on the drum, as indicated in Fig. 1. These strips are engaged by the brushes 37 to 43. The strips 30, 34, 35 and 36 and the brushes 37, 41, 42 and 43 are the only ones which need consideration in connection with the portion of the apparatus illustrated, since the other three strips and brushes, i. e., 31, 32 and 33 and 38, 39 and 40 are used for controlling apparatus not shown and constituting substantially a duplication of the apparatus which is shown and described.

Referring again to the drum E (Fig. 1), the brush 23 engaging the continuous contact strip 16 is connected to the supply line Q by the wire 44, while the brushes 24 to 29 are connected to the switches M, N, O, etc. by the wires $45^a$ to $50^a$. One set of the contacts of the switches M, N, O, etc. (upper set Fig. 1) are connected to the windings 4 of the valves A, B, C, D by the wire 46, while the other set of contacts (lower set) are connected to the windings 4 of the valves A', B', C' and D' by the wire 47. The switches M, N, O, etc. are shown in neutral position. When swung so as to engage the upper set of contacts, current is supplied through the windings 4 of the valves A, B, C and D (for supplying rouge mixture) and when swung so as to engage the lower set of contacts, current is supplied through the windings 4 of the valves A', B', C' and D' (for supplying water). If only one of the switches is swung up and only one swung down, there will be one discharge of rouge mixture and one discharge of water for each revolution of the drum E. If five of the switches are swung up and one swung down, there will be five discharges of rouge mixture and one discharge of water for each revolution of the drum E. It will be seen that a wide variation of combinations of discharge may be secured by adjusting the switches in different ways. At certain periods, it may be desirable to cut off the supply of water or rouge mixture entirely.

The foregoing presupposes a completion of the circuits from the windings 4 to the negative line R and this part of each of the circuits is controlled by the hand operated switches J, K, L, etc. and the switch drum F, such switch drum serving to regulate the period of time which each of the valves remains open. In the completing and breaking of the circuits by the drum E, the relays G, H and I come into play in order to increase the life of the drum strip and brush contacts, (this expedient being well known in the art), but such relays might of course be dispensed with, in which case the wires 48, 49 and 50 would be connected directly to the brushes 43, 42 and 41, respectively.

The contact strips 36, 35 and 34 are of varying length to give a varying period in the length of opening of the valves. For instance, if only the strip 36 is brought into play, the valves controlled thereby will only remain open while the drum F makes about one-fourteenth of a revolution. If only the strip 34 is brought into play, the valves controlled thereby will remain open while the drum F makes about one-sixth of a revolution. If all of the strips are brought into play, the valves controlled thereby will remain open while the drum E makes about one-third of a revolution.

The circuits through the wires 48, 49 and 50 from the windings 4 to the relays G, H, and I are completed by means of the switches J, K, L, etc. If the switch J is closed, a circuit from the wire 46 to the wire 48 is completed, and when the contact strip 36 engages the brush 43 so that the relay G closes, such wire 48 is brought into circuit with the wire $51^a$ connected through the switch P with the negative line R. This completion of the circuit energizes the winding 4 of the valves A, B, C and D, and these valves remain open until the strip 36 passes from beneath the brush 43. If the switches J, K, and L are all closed, the circuits through all three of the wires 48, 49 and 50 are completed so that the valves A, B, C and D remain open until all three of the strips 36, 35 and 34 pass beneath the brushes 43, 42 and 44, this adjustment giving the maximum period of opening of the valves.

The valves A', B', C' and D' are similarly controlled by the other three of the switches of the set J, K, L, etc., such switches bringing the wire 52 into connection with the wires 48, 49 and 50.

The operation, restated briefly with a single adjustment, which will be sufficient in view of the preceding explanation is as follows. Assuming that it is desired to supply five applications of rouge mixture and one of water for each rotation of the drum E, and that these applications are each to be of a maximum amount, the rates of movement of the drums being one revolution of the drum E to six revolutions of the drum F. To give the result stated, the first five of the valves M, N, O, etc. would be swung to upper position, while the last one would be swung to lower position, and the valves J, K, L, etc. would all be closed. When the contact strip 17 on the drum E comes into contact with the brush 24, a circuit is completed between the wire 44 and the wire 45$^a$, which are connected with the wires 48, 49 and 50 through the intermediary of the switches M, N, O, etc., the wire 46, the windings 4, the wire 51 and the switches J, K, L, etc. The circuits between the wires 48, 49 and 50 and the wire 51$^a$ are now closed by the relays G, H and I, while the brushes 43, 42 and 41 are in contact with the strips 36, 35 and 34, so that the rouge supply valves A, B, C, and D are held open while the strips 36, 35 and 34 are passing beneath their brushes. After they pass off of the strips 36, 35 and 34, the circuits are broken and the valves close and remain closed while the drum F rotates two-thirds of a revolution when the strip 36 again comes into contact with the brush 43. During this last two-thirds revolution of the drum F, the drum E is rotating the length of the strip 17 and the strip 18 comes into contact with the brush 25. The cycle, as above described, is now repeated, the rouge valves A, B, C and D again being opened and held open while the drum F rotates one-third of a revolution, at which time they close and remain closed until the strip 18 passes beneath the brush 25 and the strip 19 comes into contact with the brush 26. The intermittent supply of rouge is continued in accordance with this cycle until the strip 21 passes from beneath the brush 28, at which time the brush 29 is engaged by the strip 22. This gives an actuation of the water supply valves A', B', C' and D', since the right hand one of the series of switches M, N, O, etc. is in down position and the switches J, K, L, etc. are closed so that the circuit between the wire 50$^a$ and the wires 48, 49 and 50 is completed. The supply of water during a third of the revolution of the drum F as controlled by the contact strips 36, 35 and 34 is secured in the same manner as heretofore explained in connection with the supply of rouge. This completes the cycle involving one revolution of the drum E and six revolutions of the drum, during which period there have been five intermittent supplies of rouge mixture through all of the valves A, B, C, and D and one supply of water through all of the valves A', B', C' and D'. A new cycle is now begun, the cycles being repeated as long as the switches M, N, O, etc. and J, K, L, etc. remain in the positions specified in the beginning.

What I claim is:

1. The combination with a plurality of electro-magnetic windings, which are to be energized and a source of electric current, of a rotating drum provided with a series of separate contact strips each extending a part of the way only around the drum, brushes engaging the strips, a plurality of circuits from said source of current each one of which passes through one of said windings and one of said strips and its brush, a manually operable cut off switch in each of said circuits, a second rotating drum provided with a series of separate contact strips of different lengths, brushes engaging said strips, and means whereby any one of said contact strips on the second drum may be brought into any one or more of said circuits, the movements of the drums being timed so that said circuits are maintained through the brushes and strips of the first drum, while the brushes of the second drum are in contact with the strips on such drum.

2. The combination with a plurality of electro-magnetic windings, which are to be energized and a source of electric current, of a rotating drum provided with a series of separate contact strips each extending a part of the way only around the drum, brushes engaging the strips, a plurality of circuits from said source of current each one of which passes through one of said windings and one of said strips and its brush, a manually operable cut off switch in each of said circuits, a second rotating drum provided with a series of separate contact strips, arranged at different angular positions around the drum, brushes engaging said strips, and means whereby any one of said contact strips on the second drum may be brought into any one or more of said circuits, the movements of the drums being timed so that said circuits are maintained through the brushes and strips of the first drum, while the brushes of the second drum are in contact with the strips on such drum.

3. The combination with a plurality of electro-magnetic windings, which are to be energized and a source of electric current, of a rotating drum provided with a series of separate contact strips each extending a part of the way only around the drum, brushes engaging the strips, a plurality of circuits from said source of current each one of which passes through one of said windings and one of said strips and its brush, a manually operable cut off switch in each of said circuits, a second rotating drum provided with a series of separate contact strips of different lengths, arranged at different angular positions around the drum, brushes engaging said strips, and means whereby any one of said contact strips on the second drum may be brought into any one or more of said circuits, the movements of the drums being timed so that said circuits are maintained through the brushes and strips of the first drum while the brushes of the second drum are in contact with the strips on such drum.

4. The combination with a plurality of electro-magnetic windings, which are to be energized and a source of electric current, of a rotating drum provided with a series of separate contact strips each extending a part of the way only around the drum, brushes engaging the strips, a plurality of circuits from said source of current each one of which passes through one of said windings and one of said strips and its brush, a manually operably cut off switch in each of said circuits, a second rotating drum provided with a series of separate contact strips arranged at different angular positions around the drum, brushes engaging said strips, and means whereby any one or more of said contact strips on the second drum may be brought into any one or more of said circuits, the movements of the drums being timed so that said circuits are maintained through the brushes and strips of the first drum while the brushes of the second drum are in contact with the strips on such drum.

5. The combination with a plurality of electro-magnetic windings, which are to be energized and a source of electric current, of a rotating drum provided with a series of separate contact strips each extending a part of the way only around the drum, brushes engaging the strips, a plurality of circuits from said source of current each one of which passes through one of said windings and one of said strips and its brush, a manually operable cut off switch in each of said circuits, a second rotating drum provided with a series of separate contact strips of different lengths arranged at different angular positions around the drum, brushes engaging said strips, and means whereby any one or more of said contact strips on the second drum may be brought into any one or more of said circuits, the movements of the drums being timed so that said circuits are maintained through the brushes and strips of the first drum while the brushes of the second drum are in contact with the strips on such drum.

6. The combination with a plurality of electro-magnetic windings, which are to be energized and a source of electric current, of a rotating drum provided with a series of separate contact strips each extending a part of the way only around the drum, brushes engaging the strips, a plurality of circuits from said source of current each one of which passes through one of said windings and one of said strips and its brush, a manually operable cut off switch in each of said circuits, a second rotating drum provided with a series of separate contact strips of different lengths, brushes engaging said strips, and a manually operable switch and relay controlled thereby for bringing into any one of said circuits any one of said contact strips on the second drum, the movements of the drums being timed so that said circuits are maintained through the brushes and strips of the first drum while the brushes of the second drum are in contact with the strips on such drum.

7. The combination with a plurality of electro-magnetic windings, which are to be energized and a source of electric current, of a rotating drum provided with a series of separate contact strips each extending a part of the way only around the drum, brushes engaging the strips, a plurality of circuits from said source of current each of which passes through one of said windings and one of said strips and its brush, a manually operable cut off switch in each of said circuits, a second rotating drum provided with a series of separate contact strips and a manually operable switch and relay controlled thereby for bringing into any one of said circuits any one of said contact strips on the second drum the movements of the drums being timed so that said circuits are maintained through the brushes and strips of the first drum while the brushes of the second drum are in contact with the strips on such drum.

8. The combination with a plurality of electro-magnetic windings, which are to be energized and a source of electric current, of a rotating drum provided with a series of separate contact strips each extending a part of the way only around the drum, brushes engaging the strips, a plurality of circuits from said source of current each one of which passes through one of said windings, a manually operable cut off switch in each of said circuits, a second rotating drum provided with a series of separate contact strips, arranged at different angular positions around the drum, brushes engaging said strips, and a manually operable switch and relay controlled thereby for bringing into any one of said circuits any one or more of said contact strips on the second drum, the movements of the drums being timed so that said circuits are maintained through the brushes and strips of the first drum while the brushes of the second drum are in contact with the strips on such drum.

9. The combination with a plurality of electro-magnetic windings, which are to be energized and a source of electric current, of a rotating drum provided with a series of separate contact strips each extending a part of the way only around the drum, brushes engaging the strips, a plurality of circuits from said source of current each one of which passes through one of said windings and one of said strips and its brush, a manually operable cut off switch in each of said circuits, a second rotating drum provided with a series of separate contact strips of different lengths, arranged at different angular positions around the drum, brushes engaging said strips, and a manually operable switch and relay controlled thereby for bringing into any one of said circuits any one of said contact strips on the second drum, the movements of the drums being timed so that said circuits are maintained through the brushes and strips of the first drum while the brushes of the second drum are in contact with the strips on such drum.

10. The combination with a plurality of electro-magnetic windings, which are to be energized and a source of electric current, of a rotating drum provided with a series of separate contact strips each extending a part of the way only around the drum, brushes engaging the strips, a plurality of circuits from said source of current each one of which passes through one of said windings and one of said strips and its brush, a manually operable cut off switch in each of said circuits, a second rotating drum provided with a series of separate contact strips of different lengths and a manually operable switch and relay controlled thereby for bringing into any one of said circuits any one or more of said contact strips on the second drum, the movements of the drums being timed so that said circuits are maintained through the brushes and strips of the first drum while the brushes of the second drum are in contact with the strips on such drum.

11. The combination with a plurality of electro-magnetic windings, which are to be energized and a source of electric current, of a series of circuits from said source of supply, one of which passes through each of said windings, a pair of switch drums rotating in timed relation for controlling the flow of current through said windings, and a pair of manually operable switches in each of said circuits, one of which controls the flow of current through one drum switch, and the other of which controls the flow of current through the other drum switch, one of said drums being arranged to control the frequency or intervals at which current is supplied through said circuits, and the other switch drum being arranged to control the length of time during which current flows through each circuit.

In testimony whereof, I have hereunto subscribed my name this 29th day of December, 1926.

HALBERT K. HITCHCOCK.